Feb. 21, 1967    R. J. W. C. STOW    3,305,037
CONTROL VALVE FOR TRACK LAYING TRACTOR
Filed Aug. 21, 1964    3 Sheets-Sheet 1
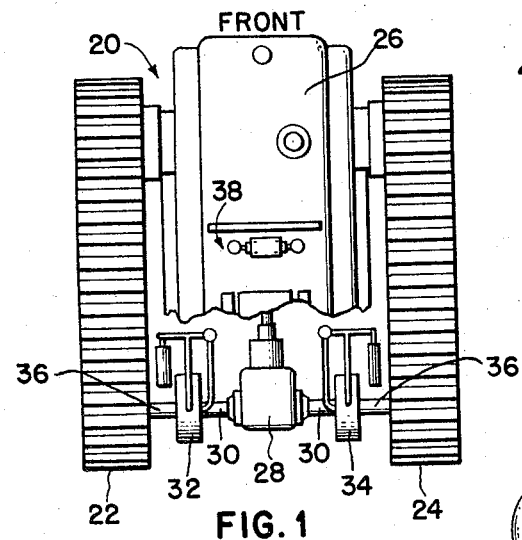
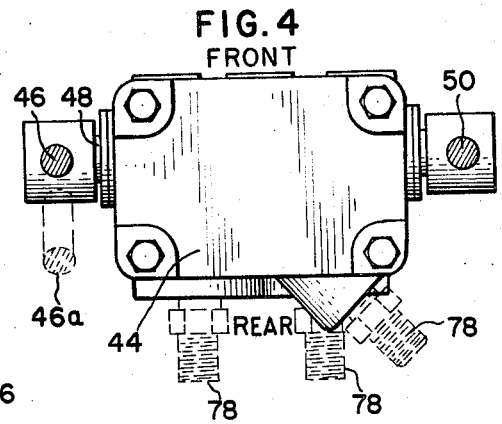
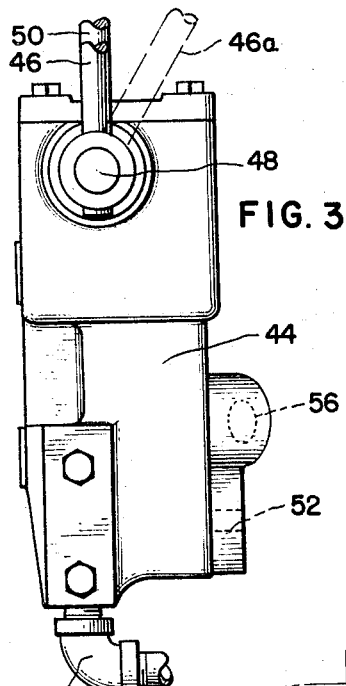
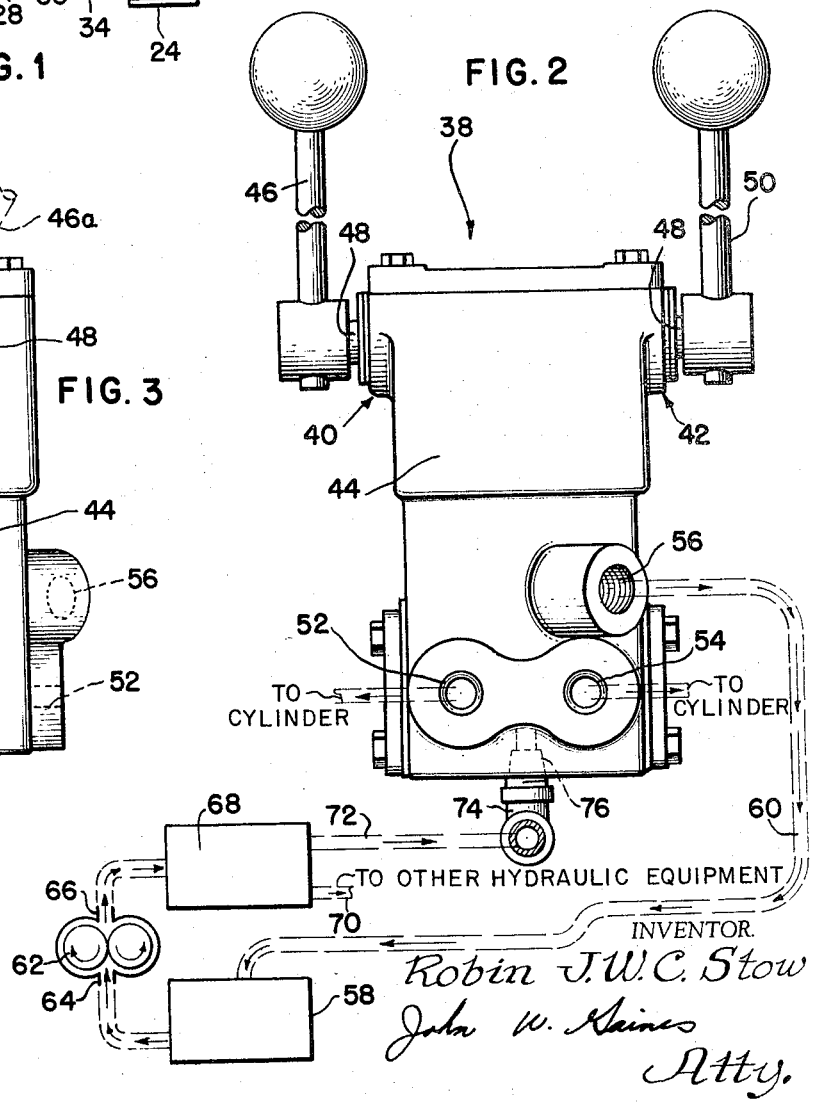
INVENTOR.
Robin J.W.C. Stow
John W. Haines
Atty.

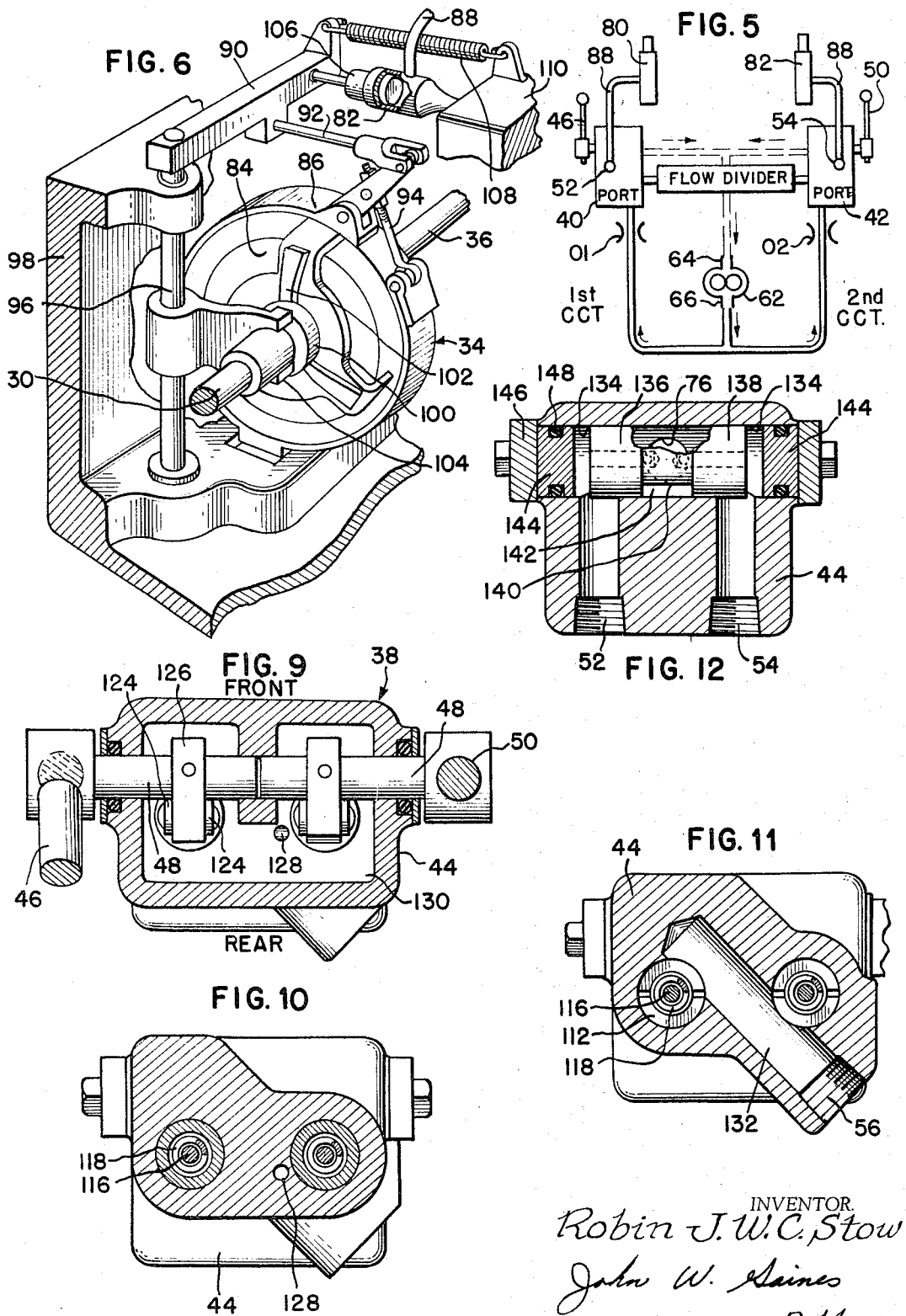

Feb. 21, 1967   R. J. W. C. STOW   3,305,037
CONTROL VALVE FOR TRACK LAYING TRACTOR
Filed Aug. 21, 1964   3 Sheets-Sheet 3
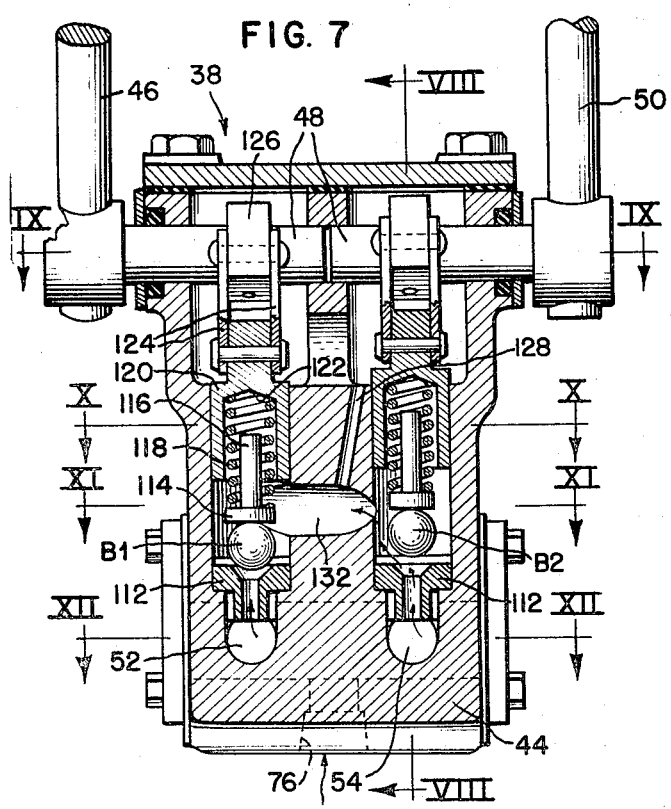
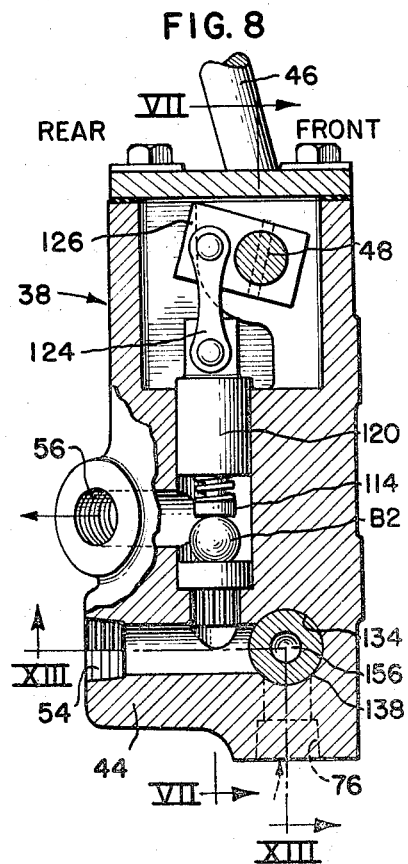
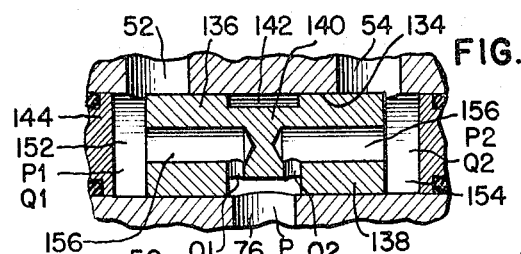
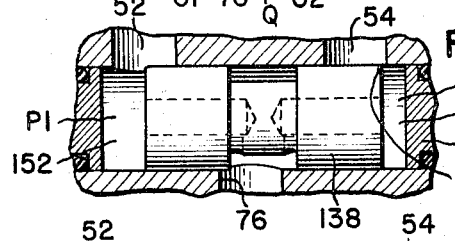
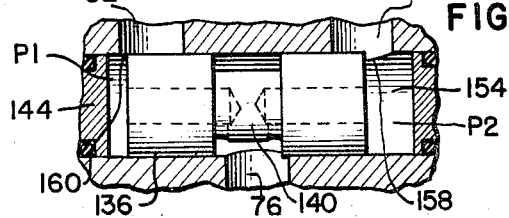
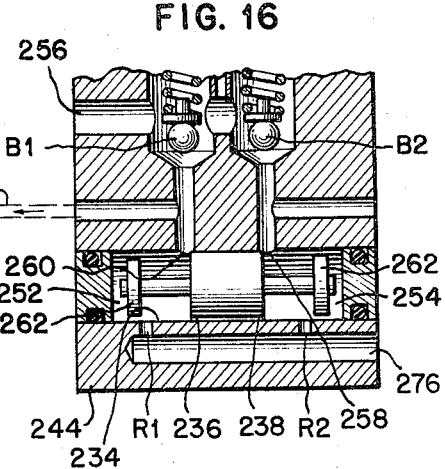
INVENTOR.
Robin J.W.C. Stow
John W. Gaines
Atty.

3,305,037
CONTROL VALVE FOR TRACK LAYING TRACTOR
Robin J. W. C. Stow, East Flamboro Township, Ontario,
Canada, assignor to International Harvester Company,
Chicago, Ill., a corporation of New Jersey
Filed Aug. 21, 1964, Ser. No. 391,277
8 Claims. (Cl. 180—6.2)

This application relates to a control valve unit for turning track laying tractors. More particularly, it relates to an assembly of hand-steering valves having a common flow divider which is provided on the upstream or pressure side of the hand valves and which is continually self-adjusting. There are two hand valves in the assembly presently illustrated, and they are included in a by-pass type fluid system so as to by-pass fluid directly to a reservoir in the system.

At a point between the common flow divider and the hand valves themselves, each hand valve according to the invention is hydraulically connected to a different one of drive control and steering mechanisms provided on the opposite sides of the tractor, and the flow divider enables fluid flow to be maintained substantially equally divided between valves irrespective of the individual hydraulic pressure or power demand of either of the drive control and steering mechanisms. Hence, the flow of pressure fluid is at all times available to each hand valve despite any inordinate demands of the other valve at the same time. The pressures are thus maintained independently in the drive control and steering mechanisms, each pressure being solely in proportion to the force applied to the associated hand valve and each drive control and steering mechanism responding to its own hand valve without interaction.

A difficulty in hydraulics according to present practices has been encountered in the effort to maintain independent pressure and flow in one or more hydraulic control circuits without starving the circuits in parallel therewith. The difficulty is aggravated in systems wherein there is only one source of supply, such as a single pump common to all circuits of the system. It is therefore the practice to provide separate regulators and other controlling devices which, although they operate independently, will tend collectively to maintain the separate flows at the desired individual pressures. Such devices make the system complicated, they increase the number of components in the circuits, and they add expense.

An object of my invention is to overcome the foregoing difficulties, and more particularly to provide a simplified valving arrangement, effective to balance the flow in a multi-circuit hydraulic system having a single source of supply of pressure fluid.

A further object, in line with the objective just stated, is the provision of such a balanced system especially adapted for the power steering of a vehicle steered by driving, and affording turns made by the vehicle to the left and right without interaction between the separate circuits utilized for hydraulically turning the vehicle either way.

A more specific object is to provide, in a power steering system having a single fluid-under-pressure source of supply to motors in the system: first and second drive control and steering motors; a pair of operator-operated valves each arranged with an inlet-outlet port therein and with the port of each valve connected to a different one of said motors; a first circuit including a flow divider for hydraulically interconnecting the source and one of the operator-operated valves; a second circuit including the flow divider for hydraulically interconnecting the source and the other valve; the pair of valves being responsive to pressure from the operator to create a proportional back-pressure in the first and second circuits, thereby selectively rendering the motors operative; the flow divider comprising a valve bore having a continuously self adjusting third valve positioned therein and connected in the first and second circuits to create a balanced division of flow therebetween; and a pressure dropping restriction in each circuit upstream of chambers in the ends of the valve bore and communicating pressure thereinto to create differences in pressure drop acting across the third valve in opposite directions.

The third valve according to my invention is therefore subject to the chamber pressure acting thereon in one direction due to a relative decrease in fluid flow in the first circuit, and in the opposite direction due to a decrease in fluid flow in the second circuit, the third valve being adapted to assume a neutral position when the flows are substantially equal. A pressure differential, if created on the third valve in its neutral position, causes valve movement into the second circuit in a flow decreasing direction when the pressure on the operator-operated valve in the first circuit exceeds the pressure on the other operator-operated valve, and valve movement into the first circuit in a flow decreasing direction when the pressure on the operator-operated valve in the second circuit exceeds the pressure on the other operator-operated valve.

It is apparent from the foregoing that fluid is continually being bypassed directly to a reservoir in the system in all operating and non-operating conditions of an individual drive control and steering motor, and that precise finger-tip control over the associated operator-operated valve affords a means of hydraulically holding the motor steady in an operating position, or incrementally retractively or extensively adjusting the motor position. During retraction, fluid is bled from the motor and returned to the reservoir, whereas during extension the fluid is diverted in part from being bypassed and is circulated to the motor.

The invention is primarily adapted for use in a two-valve system for independently controlling cylinders of identical stroke and diameter. More broadly however, my invention is equally applicable in valve assemblies with differing numbers and varying types of control valves, such valves being used in the same system with one another for operating a number of implements or cylinders having different load capacities; in each case, the principles hereof provide a means whereby the rate of flow can readily be varied and the hydraulic pressure can be gradually or abruptly applied to or removed from each cylinder in accordance with its individual load demand. The gradual application and gradual release—also known as feathering—of hydraulic pressure is accomplished in any one of the several circuits without interference from the flow in others.

Further features, objects, and advantages will either be specifically pointed out or become apparent, when for a better understanding of the invention, reference is made to the following written description, taken in conjunction with the accompanying drawings which illustrate certain prefered embodiments hereof, and in which:

FIGURE 1 is a plan view of a crawler tractor which is steered by driving and which embodies the present hydraulic power steering system;

FIGURES 2, 3 and 4 are external veiws in rear elevation, left side elevation, and top plan respectively of a hand controlled valve assembly in the steering system;

FIGURE 5 is a schematic view of the hydraulic circuit;

FIGURE 6 is an isometric view, to enlarged scale, of a tractor clutch and brake control appearing on the right-hand side as viewed in FIGURE 1;

FIGURES 7 and 8 are longitudinal sectional views (taken along section lines VII—VII and VIII—VIII of one another) in rear elevation and in side elevation, respectively, of the valve assembly of FIGURE 2;

FIGURES 9, 10, 11 and 12 are transverse sectional views taken along the lines IX—IX, X—X, XI—XI, and XII—XII of FIGURE 7;

FIGURES 13, 14 and 15 are a series of cross sectional views showing a sequence of regulating positions of flow divider valve in the valve assembly; FIGURE 13 being taken along the section lines XIII—XIII of FIGURE 8; and FIGURE 16 is a sectional view of a modified form of flow divider valve.

More particularly in FIGURE 1 of the drawings, a tractor 20 is shown having the body suspended on endless crawler track assemblies consisting of a left track 22 and a right track 24 as viewed in FIGURE 1. An engine 26 at the forward end of the tractor body is connected by transmission means, not shown, to drive a longitudinally extending propeller shaft which is connected to a rear drive differential 28. Oppositely extending rear axles 30 from the differential 28 are connected by a brake and clutch unit 32 and a brake and clutch unit 34, respectively, to the final drives 36 for the tracks.

The clutch and brake units 32 and 34 constitute the drive control and steering mechanisms of the tractor and are provided with standard mechanical controls connected thereto for steering and driving the vehicle, including upstanding hand levers, not shown, for the clutches and an upstanding pedal or separate pedals, not shown, for the brakes.

A hydraulic system including a hand valve assembly 38 is provided according to the invention for hydraulically controlling the units 32 and 34 by means of two power cylinders so that the tractor 20 is operable by power steering. The assembly illustrated has two operator-operated valves which, if desired, can be made as separate sectional valves bolted together.

Actually however, according to FIGURES 2, 3 and 4 of the drawings, the first and second hand valves 40 and 42 illustrated are included in a common valve block 44 forming the valve assembly housing. A lever 46 which is on the left as viewed in FIGURE 2 and which controls the left track 22, is fast to one of two independent shafts 48 journalled in the block 44 for controlling the first valve 40. A right lever 50 for controlling the right track 24 is fast to the other shaft 48 and operates the second valve 42.

Suitable ports are provided in the block 44 for receiving and returning fluid supplied to the valve assembly 38. Two inlet-outlet ports designated 52 on the left and 54 on the right as viewed in FIGURE 2, communicate with respective power cylinders, not shown, which hydraulically operate the clutch and brake units 32 and 34. A common fluid return port 56 communicates with a reservoir 58 through a connecting conduit 60. A pump 62 has its suction side 64 connected by a conduit to the reservoir 58 and draws hydraulic fluid therefrom. The pump 62 is driven by the tractor engine 26 and discharges hydraulic fluid under pressures which may rise to as high as 500 pounds per square inch.

A conduit connects the discharge side of the pump and a flow divider 68, which divides the pump outlet and delivers the fluid under pressure through a conduit 70 to other hydraulic equipment on the tractor, and at the same time insures delivery of one and a half gallons per minute through a conduit 72 leading to the valve block 44. The conduit 72 is connected to a fitting 74 received in a valve inlet port 76 in the block.

The ports 52, 54 and 56 are threaded to receive suitable line fittings 78 which are connected to the conduits described and which are shown in phantom lines in FIGURE 4.

In the schematic showing appearing in FIGURE 5 the two cylinders referred to for operating the units 32 and 34 of the drive control and steering mechanisms consist of a first cylinder 80 and a second cylinder 82. From the discharge side 66 of the pump 62, the fluid flow is split (within the valve block 44, not shown) so as to pass through a first orifice O1 which is inside the block interposed in a first circuit, and a second orifice O2 which is inside the block in a second circuit. The first and second valves 40 and 42 have a common divider valve, designated flow divider, which equally divides the flow so that part of the fluid is always available to the inlet-outlet port 52 communicating through a service line 88 with the first cylinder 80, and a remainder is always available to the inlet-outlet port 54 communicating through a service line 88 with the second cylinder 82. Fluid can be by-passed by the valves 40 and 42 for direct return to the suction side 64 of the pump 62; also the fluid can be supplied to, retained, or released from the first and second cylinders 80 and 82 as desired, independently of one another.

In FIGURE 6, only the clutch and brake unit 34 of the steering and driving mechanism for the right hand track 24 is illustrated and particularly described, because the units 32 and 34 are symmetrically identical to one another. In the unit 34, a disc clutch 84 and a band brake 86 have a common actuating cylinder 82 and also have a common actuating arm 90 which swings in its position either in response to the cylinder 88 or independently thereof under manual operation. A mid-portion of the arm 90 carries a pull rod 92 which, upon movement to the left as viewed in FIGURE 6, operates a linkage 94 to apply the band brake 86. Engagement of the brake 86 provides friction and stops the final drive mechanism 36.

The arm 90 is fast to a vertical rock shaft 96 journaled in a stationary frame 98 supporting the unit 34. A clutch release bearing 100 controls the clutch fingers 102 for operating the disc clutch 84 and is controlled by a swinging release fork 104 which is fast to the rock shaft 96. The clutch 84 frictionally engages the final drive 36 to turn with the driving axle 30, or disengages the final drive 36 to free it from the axle 30. When the arm 90 moves so as to pull the pull rod 92, that movement causes the shifter fork 104 to disengage the clutch 84, the linkage 94 being so adjusted that the clutch 84 completely disengages axle 30 from the final drive 36 at a time prior to band brake 86 starting to engage the final drive 36.

Cylinder 82 is a single acting cylinder, to and from which the associated cylinder service line 88 supplies and exhausts fluid so that a ram 106 undergoes extensible and retractive movement in the cylinder. The arm 90 and the ram 106 are provided therebetween with a lost motion connection, not shown, allowing the arm 90 to move both with the ram, and without moving the ram. A return spring 108 is secured at one end to a base 110 for the cylinder 82 and is secured at the opposite end to the outer end of the arm 90 in a way to oppose extensible movement of the cylinder, i.e., to cause the axle to drive the final drive.

The arm 90, when cylinder 82 is extensibly operated, gradually disengages the clutch 84 and then gradually engages the band brake 86 in that order, enabling the axle 30 to continue turning under no load and the final drive 36 to be stopped. The arm 90, when the pressure in cylinder 82 is released allowing the return spring 108 to contract, gradually disengages the band brake 86 and then gradually re-engages the clutch 84 so that the final drive 36 turns at the driven speed of axle 30.

In FIGURES 7, 8 and 9, the valve assembly 38 is illustrated in a left turn condition, with the right lever 50 in an unactuated vertical position and the left lever 46 retracted in a slightly rearwardly tilted feathering position. Valve seats 112 are provided (FIGURE 7), in relation to which a first ball valve element B1 is shown partially open in a first circuit, and a second ball valve element B2 is shown fully open in a second circuit. The respective seats in those circuits are operatively downstream of the inlet-outlet ports 52 and 54 which service the respective first and second cylinders 80 and 82.

The ball valve elements are separately operated, but by identical mechanisms, and the mechanism for operating only the element B1 is herein described. The ball valve element B1 is backed on top by a pad 114 having a guide stem 116 and acting both as a spring seat and a guide for the outer end of a helical compression spring 118. A piston shaped plunger member 120 reciprocated by the operator, has a deep, downwardly open socket 122 receiving the spring 118 therein. Two spaced apart pitman links 124 pivotally connect the upper end of the plunger 120 and the outer end of a crank block 126 which is fast to the adjacent shaft 48 operated by lever 46.

In FIGURES 7, 9, and 10, a generally vertically disposed drain passage 128 in the block 44 leads fluid collected in a basin 130 downwardly so that it will drain off in a horizontal, diagonally disposed passage 132 shown in FIGURE 7. Any fluid which so collects in the basin results from leakage outwardly past the reciprocable plungers 120 appearing in block 44 of FIGURE 7.

In FIGURE 7, the diagonal passage 132 just referred to receives fluid released by the first and second ball valve elements B1 and B2 and communicates the fluid to the fluid return port 56 for discharge to the reservoir in the system.

In FIGURES 8 and 12, fluid from the inlet port 76 of the valve block 44 enters the valve bore 134 of a flow divider and the flow is split into a first circuit to supply the inlet-outlet port 52 and into a second circuit to supply the inlet-outlet port 54. A one-piece flow divider valve which freely reciprocates in the bore 134 has opposite end spools 136 and 138 integrally joined together by center section 140 of reduced diameter. The end spools 136 and 138 cooperate with the reduced center section 140 to define an annular groove 142 which communicates at all times with the inlet port 76.

The opposite ends of the bore 134 are blocked by plugs 144, each of which being held in place by a bolted on retainer plate 146 and each carrying an O-ring seal 148 which engages an inner circumference of the bore 134.

In FIGURE 13, the one piece flow divider valve is shown in the neutral or centered position within the valve bore 134, and the plugs 144 cooperate with the respective spools 136 and 138 to define opposite end chambers 152 and 154 in the bore. At longitudinally spaced apart points, the reduced center section 140 of the flow divider valve is drilled radially inwardly to define first and second orifices O1 and O2 which communicate with the respective chambers 152 and 154 by means of separate longitudinal passages 156 which extend in opposite directions from the center section. The orifices O1 and O2 are of fixed size, being identical in length and diameter with respect to one another. The size is chosen so that, with full flow therethrough, there is only a slight pressure drop across the orifices.

Inlet flow is indicated by Q in inlet port 76 and inlet pressure is indicated by P, the pressure P being a fluctuating pressure depending upon loads in the hydraulic system. On the other hand, the flow Q is constant and the respective split flows indicated at Q1 and Q2 through the end chambers 152 and 154 are maintained constant and equal for reasons now to be explained. On the other hand, the pressures indicated by P1 and P2 within the respective end chambers 152 and 154 fluctuate independently of one another, depending on the respective loadings of the first and second circuits.

Pressure drop across an orifice increases with the quantity of flow through that orifice. When the flow through the first and second orifices O1 and O2 is equal, there is an equal pressure drop from the common pressure P; hence, the respective pressures P1 and P2 are equal and the free flow divider valve is dynamically stable, being hydraulically in equilibrium. A decrease of flow through the first orifice O1 (induced when the operator restricts the first circuit by movement of the ball valve element B1 into the position shown in FIGURE 7) reduces the pressure drop thereacross, causing increase of the pressure P1 which presses the spool 136 away from chamber 152.

The result of the condition just referred to is illustrated in FIGURE 14, wherein the flow divider valve is shifted to the right, as viewed in FIGURE 14, to a point where the spool 138 reduces the opening 158 of an associated second circuit valve port 158 sufficiently to restrict the flow through the second orifice O2, and the flow Q2 equalizes with the flow Q1. The pressures in the chambers 152 and 154 are perforce equalized, and the flow divider valve is again dynamically stable, having balanced the flows Q1 and Q2 in the way desired. If the flow divider valve overshifts to the right as viewed in FIGURE 14, the pressure P2 predominates over pressure P1 and readjusts the valve sufficiently to the left as viewed in FIGURE 14 so that the flow rates Q1 and Q2 equalize.

As viewed in FIGURE 15, leftward shift of the flow divider valve leaves the valve port 158 uninterfered with, but restricts the flow through an associated second circuit valve port 160 and the spool 136 occupies a restricting position over the port 160 so that the pressure P1 balances the pressure P2.

In operation of the vehicle steering system of FIGURES 1 to 15 preceding, a gradual left turn is executed by applying slight pressure to the left lever 46 so that it retracts into the minor tilted position shown in FIGURES 7 and 8. In that position, back pressure builds in the first circuit to a value at which the disc clutch of the unit 32, FIGURE 1, is feathered so that the left track 22 is slip-driven at an average rate slower than the solidly driven right track 24.

Moderate pressure on the left lever 46 moving it to a further rearward position, as indicated by the dotted lines 46a in FIGURES 3 and 4, brings about complete disengagement of the disc clutch and causes feathering of the band brake in the unit 32, FIGURE 1. A sharper turn to the left results when the left track 22 is partially braked further, whereas the right track 24 continues turning under the applied engine torque.

Full rearward movement on the left lever 46 as viewed in FIGURE 7 introduces maximum back pressure in the first fluid circuit and hence the inlet-outlet port 52 communicates maximum pump pressure to lock the final drive 36 for the left track 22. Locking of the left track 22 causes the vehicle to pivot about a fixed point, revolving sharply to the left. In each instance when the plunger 120 of FIGURE 7 incrementally changes position, the spring 118 provides the necessary elastic adjustment so that, under the reactive force of the fluid back pressure over the seating area of the valve seat 112, the ball valve element B1 can yield in its position until it establishes a balanced condition with the spring 118. Hence the desired relation of hydraulic feel-back results and the operator can sense in the lever 46 the relative degree of load being overcome.

Rearward movement of the right lever 50 as viewed in FIGURE 7 results in the same degree of incremental control over the engageable clutch 84 and brake 86 of the unit 34 of FIGURE 6 affording, from an intermediate position of movement of the arm 90, a condition whereby movement in a direction from that position causes engagement of the brake or clutch, one or the other, and movement of the arm in the opposite direction causes engagement of the other one of the clutch or brake.

Rearward movement of levers 46 and 50 both in unison locks both tracks 22 and 24. Thereafter, if a feathering action is applied on the levers both in unison, it provides inching control to move the tractor gradually and under high torque. Left and right turns in the rearward direction are accomplished in a way obvious from the foregoing description, the difference for reverse being that the transmission means (not shown) of the tractor is placed in reverse instead of in the forward drive position.

In the modification of FIGURE 16, the structure is the same including the ball valve elements B1 and B2, but the free, one-piece third valve in the flow divider is different. In lieu of the orifices being formed in the free valve, the orifices R1 and R2 are stationary, being formed in the valve block 244. The orifices R1 and R2 are identical in length and diameter, and split the flow from an inlet manifold 276 so that the fluid divides between a first and a second circuit leading through a valve bore 234. A center spool on the free valve divides the bore 234 into separate chambers, and opposite land portions indicated at 236 and 238 on the spool control first and second valve openings 260 and 258, respectively, which communicate with the bore. The free valve has oppositely extending stems carrying identical pistons 262 which are smaller in diameter than the bore 234 by a slight amount and which define, with the opposite ends thereof, two dashpot chambers 252 and 254 respectively.

The restricted flow of fluid past the pistons 262 damps any sudden movement of the free flow divider valve, reducing, if any, for the valve to hunt while in its positions of self-adjustment.

Balanced pressures in the respective chambers 252 and 254 act in opposition across the valve to maintain it in a dynamically stable, adjusted condition in which it is in hydraulic equilibrium.

While the assembly of FIGURE 2 is described as a three valve assembly wherein the two hand valves have a common third valve upstream thereof for automatically dividing the flow equally, it is evident that the present flow divider valve can be employed to the same advantage with multiple hand valves. Thus a two valve assembly including a flow divider valve can be employed similarly to valve 38 connected in conduit 72 of FIGURE 2, a similar valve assembly 38 including a flow divider valve can be employed in the conduit 70 of FIGURE 2, and another flow divider valve can be employed within the flow divider block 68 of FIGURE 2 so as to divide the flow between the conduits 70 and 72. The division will be in a 1:1, or 1:2, or 1:3 relation, etc., depending upon the diameter ratio between the first and second orifices. In any case, the principal function of the invention is to provide for non-synchronized operation of two or more cylinders in hydraulic systems, such systems being of the type, for example, having a common pump and serving multi-circuits in parallel, even though subject to different loads and pressures simultaneously.

In the particular application herein to a tractor, a relatively effortless and readily feathered power steering system results, providing incremental maneuverability and at all times a proportionate feel-back to the operator. Each of the one or more unitary, free, flow divider valves weighs only a few ounces, thus moving with dispatch and with certainty into all of its dynamically stable positions.

No mechanical stops are essential to keep the flow divider valve out of its extreme positions of movement in the valve bore and, self-evidently, the valve in either direction of movement would partially or wholly block the associated valve port at one end. Therefore, fluid entering the end chamber at that end of the valve bore would be without an escape path and automatically, incoming fluid from the pump would displace the free valve in the opposite direction so as to move away from the chamber and reopen the blocked port.

The invention is an improvement over the structure disclosed in my allowed U.S. patent application Serial No. 334,886 filed December 31, 1963, the disclosure of which is incorporated in entirety herein by reference.

Variations within the spirit and scope of the invention described are equally comprehended by the foregoing description.

What is claimed is:
1. In a power steering system having a source of supply of fluid to motors in the system:
   first and second drive control and steering motors;
   a pair of operator-operated valves each arranged with an inlet-outlet port therein and with the port of each valve connected to a different one of said motors;
   means including a flow divider forming first circuit means for hydraulically interconnecting the source and one of said operator-operated valves;
   means including the flow divider forming second circuit means for hydraulically interconnecting the source and the other valve; said valves being responsive to pressure from the operator to create a proportional hydraulic back pressure in said first and second circuit means, thereby rendering the motors operative;
   said flow divider comprising a valve bore having third valve means positioned therein and connected in the first and second circuit means for automatically adjusting the division of flow therebetween; and
   a pressure-dropping restriction in each circuit means upstream of chambers in the ends of the valve bore, and communicating therewith to create a difference in pressure drop acting from those chambers in opposite directions;
   said third valve means being subject to the chamber pressure acting in one direction thereon due to a decrease in fluid flow in the first circuit means, and in the opposite direction due to a decrease in fluid flow in the second circuit means, and adapted to assume a neutral position when the flows are substantially equal;
   said third valve means, from the neutral position, being pressure-movable in said second circuit means in a flow decreasing direction when the pressure on the operator-operated valve in the first circuit means exceeds the pressure on the other operator-operated valve, and being pressure-movable in said first circuit means in a flow decreasing direction when the pressure on the operator-operated valve in the second circuit means exceeds the pressure on the other operator-operated valve;
   said pair of valves having two fluid return port means disposed one downstream of each inlet-outlet port in the circuit means;
   each valve of the pair being characterized by having a valve member for controlling the fluid return port means to create said hydraulic back pressure, an operator's member, and biasing means between the members to transmit the force exerted by the operator and affording an elastic connection so that, under the reactive force of the fluid back pressure, the valve member yields in its position until it establishes a balanced condition with the biasing means.

2. In a vehicle steering-by-driving system having a source of supply of fluid to motors in the system:
   first and second drive control and steering motors which afford straight line steering when inoperative and which alternate in operation to steer the vehicle in opposite directions;
   a pair of valves each arranged with an inlet-outlet port therein and with the port of each valve connected to a different one of said motors;
   means including a flow divider forming first circuit means for hydraulically interconnecting the source and one of said valves;
   means including the flow divider forming second circuit means for hydraulically interconnecting the source and the other valve; said valves being responsive to pressure from the operator to create a proportional hydraulic back pressure in said first and second circuit means, thereby rendering the motors operative;

said flow divider comprising a free third valve part connected in the first and second circuit means for automatically adjusting the division of flow therebetween; and a pressure-dropping restriction in each circuit means in an upstream location causing the circuit means to operate at respectively dropped pressures acting in opposite pressure directions;

the third valve part being subject to the increased pressure acting in one direction thereon due to a decrease in fluid flow in the first circuit means, and in the opposite direction due to a decrease in fluid flow in the second circuit means, and adapted to assume a neutral position when the flows are substantially equal;

the third valve part, from the neutral position, being adapted to move in said second circuit means in a flow decreasing direction when the pressure on said valve in the first circuit means exceeds the pressure on the other valve, and being adapted to move in said first circuit means in a flow decreasing direction when the pressure on said valve in the second circuit means exceeds the pressure on the other valve;

the valves of said pair having fluid return port means disposed downstream of the inlet-outlet port, and each further including a valve member controlling the fluid return port means to create said hydraulic back pressure, an operator's member, and biasing means forming an elastic connection between the members;

each of said pair of valves constituting a combined pressure feel-back valve and a blow-off valve; said elastic connection included in each valve yielding under a full valve closure condition to relieve excessive pressure in the circuit means and, under the reactive force of fluid back pressure in the regular steering conditions, accommodating yielding movement of the valve member in its position so that said force is balanced by the biasing means and transmitted thereby to the operator's member.

3. In a power steering system having a source of supply of fluid to motors in the system:

first and second drive control and steering motors;

a pair of operator-operated valve means each arranged with an inlet-outlet port therein and with the port of each valve means connected to a different one of said cylinders;

means including a flow divider forming a first circuit for hydraulically interconnecting the source and one of said operator-operated valve means;

means including the flow divider forming a second circuit for hydraulically interconnecting the source and the other valve means;

said valve means responsive to pressure from the operator to create a proportional hydraulic back pressure in the first and second circuits, thereby rendering the motors operative;

said flow divider comprising a valve bore having third valve means positioned therein and connected in the first and second circuits for automatically adjusting the division of flow therebetween;

said valve bore being upstream of the inlet-outlet ports of said pair of operator-operated valve means;

said third valve means being subject to pressure acting in one direction thereon due to a decrease in fluid flow in the first circuit, and in the opposite direction due to a decrease in fluid flow in the second circuit, and adapted to assume a neutral position when the flows are substantially equal;

said third valve means, from the neutral position, being adapted to move in said second circuit in a flow decreasing direction when the pressure on the operator-operated valve means in the first circuit exceeds the pressure from the other operator-operated valve means, and being adapted to move in said first circuit in a flow decreasing direction when the pressure on the operator-operated valve means in the second circuit exceeds the pressure on the other operator-operated valve means;

said pair of valve means having fluid return port means disposed downstream of the inlet-outlet ports; each valve means of a pair having a valve member controlling the fluid return port means to create said hydraulic back pressure, an operator's member, and biasing means between the members to transmit the force exerted by the operator and affording an elastic connection so that, under the reactive force of the fluid back pressure, the valve member yields in its position until it establishes a balanced condition with the biasing means.

4. For use with a valve controlled system having first and second drive control and steering cylinders, and a source of fluid supply to the cylinders:

an operator-operated valve assembly having an intake port for connection to said source;

said assembly comprising first and second valves each arranged with an inlet-outlet port for connection to a different one of said cylinders;

means including a flow divider providing a first circuit in said operator-operated valve assembly hydraulically interconnecting the intake port and the first valve;

means including the flow divider providing a second circuit in said assembly hydraulically interconnecting the intake port and the second valve;

said valves being responsive to pressure from the operator to create a proportional hydraulic back pressure in the first and second circuits, for selectively pressurizing the inlet-outlet ports to render the associated cylinders operative;

said flow divider comprising third valve means common to the first and second circuits for automatically adjusting the division of flow therebetween, the third valve means having separate longitudinal, main fluid passages formed each in a different end of the valve means, and two fixed size orifice means in a portion of the valve means intermediate said ends, and each connected with, and supplying fluid to, a different one of the longitudinal main fluid passages.

5. For use with a valve controlled, hydraulic system having first and second drive control and steering cylinders, and a source of fluid supply to the cylinders:

a valve assembly having intake port means for connection to said source;

said assembly comprising first and second valves each arranged with an inlet-outlet port for connection to a different one of said cylinders;

means including a flow divider valve and providing a first circuit in said assembly hydraulically interconnecting the intake port means and the first valve;

means including the flow divider valve and providing a second circuit in said assembly hydraulically interconnecting the intake port means and the second valve;

said flow divider valve having a valve bore part, and a free valve part in the bore part and connected in the first and second circuits for automatically adjusting the division of flow therebetween;

a pressure-dropping restriction in each circuit in an upstream location causing the circuit to operate at a dropped pressure in differing pressure directions;

the valve part of said flow divider valve being subject to the increased pressure acting in one direction due to a decrease in fluid flow in the first circuit, and in the opposite direction due to a decrease in fluid flow in the second circuit, and adapted to assume a neutral position when the flows are substantially equal; and fluid return port means communicating with the first and second valves;

said pressure-dropping restrictions in the first and second circuits consisting of separate, fixed size orifices on the valve part.

6. For use with a valve controlled system having first and second drive control and steering cylinders, and a source of fluid supply to the cylinders:

a valve assembly having an intake port for connection to said source;

said assembly comprising first and second valves each arranged with an inlet-outlet port for connection to a different one of said cylinders;

means including a flow divider providing a first circuit in said assembly hydraulically interconnecting the intake port and the first valve;

means including the flow divider providing a second circuit in said assembly hydraulically interconnecting the intake port and the second valve;

said flow divider comprising a valve bore having an internally-passaged third valve positioned therein and connected in the first and second circuits so that the passages in the third valve receive and transmit the fluid thereof separately to those circuits for automatically adjusting the division of flow therethrough; and a fixed size, pressure-dropping restriction in each circuit formed in the third valve in an upstream location to, and communicating through, the respective valve passages to chambers in the ends of the valve bore and communicating therewith to create a drop in the chamber pressures which act in opposite directions;

said third valve being subject to the chamber pressure acting in one direction thereon due to a decrease in fluid flow in the first circuit, and in the opposite direction due to a decrease in fluid flow in the second circuit, and adapted to assume a neutral position when the flows are substantially equal;

said third valve, from the neutral position, being adapted to move in the second circuit in a flow decreasing direction when the pressure on the operator-operated valve in said first circuit exceeds the pressure on the other operator-operated valve, and being adapted to move in the first circuit in a flow decreasing direction when the pressure on the operator-operated valve in said second circuit exceeds the pressure on the other operator-operated valve;

the first and second valves having fluid return port means disposed downstream of the inlet outlet ports;

the first and second valves each further having a valve member controlling the fluid return port means to create said hydraulic back pressure, an operator's member, and biasing means between the members forming an elastic connection so that, under the reactive force of the fluid back pressure, the valve member yields in its position until it establishes a balanced condition with the biasing means.

7. For use with a valve controlled system having first and second drive control and steering cylinders, and a source of fluid supply to the cylinders:

an operator-operated valve assembly having an intake port for connection to said source;

said assembly comprising first and second valves each arranged with an inlet-outlet port for connection to a different one of said cylinders;

means including a flow divider providing a first circuit in said assembly hydraulically interconnecting the intake port and the first valve;

means including the flow divider providing a second circuit in said assembly hydraulically interconnecting the intake port and the second valve;

said valves being responsive to pressure from the operator to create a proportional hydraulic back pressure in the first and second circuits, for selectively pressurizing the inlet-outlet ports to render operative the associated cylinders;

said flow divider comprising a valve bore and a free, one-piece internally passaged valve positioned therein and connected in the first and second circuits so that the passages in the valve part receive and transmit the fluid thereof separately to the chambers for automatically adjusting the division of flow therebetween;

a fixed size, pressure-dropping restriction in each circuit formed in the valve part in an upstream location to each of the valve passages and the chambers in the ends of the valve bore and communicating pressure thereinto to create a difference in pressure drop acting in opposite directions;

said free valve being subject to the chamber pressure acting in one direction thereon due to a decrease in fluid flow in the first circuit, and in the opposite direction due to a decrease in fluid flow in the second circuit, and adapted to assume a neutral position when the flows are substantially equal;

said free valve, from the neutral position, being adapted to move in said second circuit in a flow decreasing direction when the pressure on the operator-operated valve in the first circuit exceeds the pressure on the other operator-operated valve, and being adapted to move in said first circuit in a flow decreasing direction when the pressure on the operator-operated valve in the second circuit exceeds the pressure on the other operator-operated valve; and a fluid return port communicating with the first and second valves.

8. For use with a valve controlled system having first and second drive control and steering cylinders, and a source of fluid supply to the cylinders:

an operator-operated valve assembly having an intake port for connection to said source;

said assembly comprising first and second valves each arranged with an inlet-outlet port for connection to a different one of said cylinders;

means including a flow divider valve and providing a first circuit in said assembly hydraulically interconnecting the intake port and the first valve;

means including the flow divider valve and providing a second circuit in said assembly hydraulically interconnecting the intake port and the second valve;

said valves being responsive to pressure from the operator to create a proportional hydraulic back pressure in the first and second circuits, for selectively pressurizing the inlet-outlet ports to render the associated cylinders operative;

said flow divider valve consisting of a bore part and a valve part positioned therein and connected in the first and second circuits for automatically adjusting the division of flow therebetween;

a pressure-dropping restriction in each circuit in an upstream location causing the circuits to operate at a dropped pressure acting in differing pressure directions;

the valve part of said flow divider valve being subject to the increased pressure acting in one direction thereon due to a decrease in fluid flow in the first circuit, and in the opposite direction due to a decrease in fluid flow in the second circuit, and adapted to assume a neutral position when the flows are substantially equal;

said valve part, from the neutral position, being pressure-movable in a flow decreasing direction in said second circuit when the pressure on the operator-operated valve in the first circuit exceeds the pressure on the other operator-operated valve, and in a flow decreasing direction in said first circuit when the pressure on the operator-operated valve in the second circuit exceeds the pressure on the other operator-operated valve; and fluid return port means downstream of and communicating with the first and second valves;

said first and second valves each having a valve member for controlling the fluid return port means to create said hydraulic back pressure, an operator's member, and biasing means between the members to transmit the force exerted by the operator, and affording an elastic connection so that, under the reactive force of the fluid back pressure, the valve member yields in its position until it establishes a balanced condition with the biasing means.

References Cited by the Examiner

UNITED STATES PATENTS

| | | | |
|---|---|---|---|
| 2,643,664 | 6/1953 | Willett | 91—412 X |
| 2,975,851 | 3/1961 | Youmans et al. | 180—6.2 |

FOREIGN PATENTS 549,211  11/1962  Great Britain.

BENJAMIN HERSH, *Primary Examiner.*

J. A. PEKAR, *Assistant Examiner.*